United States Patent
Grimm

(10) Patent No.: US 6,895,311 B2
(45) Date of Patent: May 17, 2005

(54) METHOD AND DEVICE FOR THE PLOTTING OF SCANNED INFORMATION, IN PARTICULAR OPERATING DATA FOR A MOTOR VEHICLE

(75) Inventor: Wolfgang Grimm, Allison Park, PA (US)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 10/363,445

(22) PCT Filed: Jul. 24, 2001

(86) PCT No.: PCT/DE01/02795

§ 371 (c)(1),
(2), (4) Date: Aug. 4, 2003

(87) PCT Pub. No.: WO02/19267

PCT Pub. Date: Mar. 7, 2002

(65) Prior Publication Data

US 2004/0024497 A1 Feb. 5, 2004

(30) Foreign Application Priority Data

Aug. 26, 2000 (DE) .......................... 100 42 005

(51) Int. Cl.⁷ ................................. G06F 7/00
(52) U.S. Cl. ............... 701/1; 701/35; 701/72; 340/3.6; 340/995.2; 377/16
(58) Field of Search ............... 701/1, 29, 35, 701/66, 72; 340/3.6, 870.16, 995.2; 377/16, 26

(56) References Cited

U.S. PATENT DOCUMENTS

| | | | |
|---|---|---|---|
| 4,258,421 A | | 3/1981 | Juhasz et al. |
| 4,603,431 A | * | 7/1986 | Grover et al. ............... 382/241 |
| 4,987,541 A | | 1/1991 | Levente et al. |
| 5,146,219 A | * | 9/1992 | Zechnall ................. 340/995.24 |
| 5,313,848 A | | 5/1994 | Santin et al. |
| 5,315,295 A | * | 5/1994 | Fujii ........................... 340/936 |
| 6,275,773 B1 | * | 8/2001 | Lemelson et al. .......... 701/301 |

FOREIGN PATENT DOCUMENTS

| | | |
|---|---|---|
| DE | 41 07 198 | 9/1991 |
| DE | 43 44 528 | 6/1995 |
| EP | 0 093 190 | 11/1983 |
| EP | 0 834 146 | 4/1998 |
| WO | WO 90 13890 | 11/1990 |

OTHER PUBLICATIONS

H. Y. P Lim, *Interactive Data Compression Tutor*, School of Electrical and Electronics Engineering, Birmingham, UK, Feb., 1998.

* cited by examiner

Primary Examiner—Gertrude A. Jeanglaude
(74) Attorney, Agent, or Firm—Kenyon & Kenyon

(57) ABSTRACT

A method and a device for recording the curve of information. The information is scanned using a specifiable scanning period. The information is specifically the operating data of a motor vehicle. The scanned information is subjected to a data reduction, and then the reduced information is stored. To record the curve of relevant digital information, in particular, of the operating data of a motor vehicle, so as to use the least possible storage space, it is proposed that, in the context of the data reduction, the curve of the scanned information be viewed in a time raster of a multiple of the scanning period, and, within the individual raster increments, at least one characteristic variable of the curve of the scanned information be determined. The device is advantageously a component part of a control device for controlling/regulating specific motor-vehicle components or of an operating- or accident-data recorder of a motor vehicle.

23 Claims, 2 Drawing Sheets

METHOD AND DEVICE FOR THE PLOTTING OF SCANNED INFORMATION, IN PARTICULAR OPERATING DATA FOR A MOTOR VEHICLE

FIELD OF THE INVENTION

The present invention relates to a method for recording the curve of information. The information is scanned using a specifiable scanning period. The information is specifically the operating data of a motor vehicle. Using the method, the scanned information is subjected to a data reduction. Then the reduced information is stored.

The present invention also relates to a control element for a control device for controlling/regulating specific motor-vehicle components or for an operating- or accident-data recorder of a motor vehicle. The control element is configured, in particular, as a read-only memory (ROM), including EPROM or EEPROM, as a random-access memory (RAM), including FeRAM, or as a flash memory. On the control element, a program is stored that can be executed on a computing device, specifically on a microprocessor.

Finally, the present invention relates to a device for recording the curve of information. The information is scanned using a specifiable scanning period. The information is specifically the operating data of a motor vehicle. The device has a means for the data-reduction of the scanned information and a means for storing the reduced information.

The present invention also relates to a computer program and a computer program product, in each case having a program code means, to carry out the recording, or data reduction procedure when the computer program or computer program product is executed on a computer or a control unit.

BACKGROUND INFORMATION

Collecting and recording the operating data of a motor vehicle is becoming more and more important (see also German Patent No. 199 14 764). The operating data are supplied by appropriate sensors and are generally made available in digital form. The operating data can be, for example, the speed of the motor vehicle, the temperature and the operating point of an internal combustion engine of the motor vehicle, the activation of the gas pedal or brakes, or the activation of specific motor-vehicle functions, in particular, the illumination or the directional lights. The operating data are recorded over time. Because the storage space is limited in a control device for controlling/regulating specific motor-vehicle components or in an operating- or accident-data recorder in a motor vehicle, it is necessary to reduce the data volume to be stored.

The data volume can be reduced in different ways. First, redundancies in the information to be stored can be avoided, i.e., identical bits of information are stored only once.

Furthermore, the data volume to be stored can be reduced through a data reduction. In this context, when being stored, information that is not viewed as relevant is dispensed with in a controlled manner. In the data reduction process, the non-relevant information content is omitted in a controlled manner. The original information can be reconstructed from the reduced information but only at a loss of information.

Finally, the information to be stored can be reduced by data compression. In this context, the number of bits necessary for storing and transmitting the information is reduced. The original information can be reconstructed without any loss of information by decompressing the compressed information.

While for data compression, very many different methods are known, specifically in the area of image data compression and information technology (e.g., Huffmann Compression; see H. Y. P Lim, "Interactive Data Compression Tutor," School of Electrical and Electronics Engineering, Birmingham, UK, February, 1998), as well as methods for the reconstruction of time signals, that are based on the Shannon scanning theorem (e.g., impulse train modulation; see A. V. Oppenheim, R. W. Schaefer, "Discrete-Time Signal Processing," Prentice-Hall, Englewood Cliffs, 1989), for data reduction there exists no generally applicable method, because a loss of information is always inevitable and therefore a function of the application.

From European Patent No. 0 834 146, a method and a device are known for the data-reduction of scanned information in an implanted medical device. The scanned information is, for example, the heart rate of a patient. It is proposed to store the time interval between two heart beats not as a time indication, but rather to assign to each time indication a specific value, which requires less storage space than the actual time indication, and then to store this value.

From German Published Patent Application No. 41 07 198, a method and a device are known for recording the operating data of a motor vehicle. To reduce the requirements for storage space, it is proposed to delete from the memory information that is older and no longer necessary. The storage space that is freed up can then be used to store current information.

A method and a device of the type cited above are known, for example, from German Published Patent Application No. 43 44 528. In that publication, a device is described for storing information in the form of digital audio signals. After a data reduction and a digital/analog (D/A) conversion, the information to be stored is saved as analog values in an analog storage. Although this publication refers to data reduction, it is really a matter, in this context, of data compression. As a method for data compression, Adaptive Differential Pulse Code Modulation (ADPCM) and Linear Predictive Coding (LPC) are proposed. The stored information can be retrieved from the memory as audio signals via an analog/digital (A/D) inverse conversion.

SUMMARY OF THE INVENTION

The present invention is based on the objective of recording the curve of relevant digital information, in particular, of operating data of a motor vehicle, so as to use the least possible storage space.

To achieve this objective, on the basis of the method of the type cited above, it is proposed that, in the context of data reduction, the scanned-information curve be viewed in a time raster of a multiple of the scanning period, and within the individual raster increments, at least one characteristic variable of the scanned-information curve be determined.

According to the present invention, a method is proposed for recording information, which, in certain applications, specifically in recording the operating data of a motor vehicle, makes possible a significant reduction in the data volume to be recorded without a loss of relevant information content. In the method according to the present invention, as the relevant information content, one characteristic variable of the scanned-information curve is stored, in each case within one raster increment of a time raster. It is obvious that as the size of the raster increments increases, the data volume to be stored can be reduced by a larger factor. In addition, the fewer the characteristic variables that are to be stored within one raster increment, the smaller the data volume to be stored becomes.

In the method according to the present invention, information to be recorded is reduced to the essentials, which makes possible significant savings in storage space. After the data reduction process described above, the data volume to be stored can be reduced even further by using a supplementary data compression method.

One characteristic variable of the scanned-information curve, which can be retrieved for the method according to the present invention, is, for example, a turning point in the curve of the scanned values, the variance or the standard deviation of the scanned values, in each case within one single raster increment. However, according to one advantageous refinement of the present invention, it is suggested that the maximum values and/or minimum values of the scanned values within the raster increments be determined as the characteristic variable of the scanned-information curve. Within one raster increment, the scanned-information curve is therefore represented by envelopes corresponding to the maximum value and/or the minimum value of the scanned values.

Alternatively or additionally, it is proposed that the average value of the scanned values within the raster increments be determined as the characteristic variable of the scanned-information curve. On the basis of the deviation of the envelope curve, a specific degree of data reduction can be read directly from the average value curve. In the event that the curves are situated far apart from each other, the curve within the raster increment in question has varied substantially. If the curves are situated close to each other, the curve has remained at a virtually constant value.

According to one preferred embodiment of the present invention, it is proposed that the raster increments be selected so as to be identical in size.

According to one alternative embodiment of the present invention, it is proposed that the raster increments be selected so as to vary as a function of further characteristic variables of the scanned-information curve within one raster increment. The size of the raster increments is therefore coupled to specific signal characteristics, which are described on the basis of the characteristic variables. Examples of these signal characteristics are statistical variables. The raster increments are advantageously selected so as to vary as a function of the standard deviation of the scanned values of the information curve within one raster increment. The raster increments are advantageously selected so as to be so small that the standard deviation does not exceed a specifiable value.

Furthermore, it is proposed that the raster increments be selected so as to vary as a function of the distance from the maximum value or from the minimum value to an average value of the scanned values within one raster increment of the information curve. Advantageously, the raster increments are selected so as to be so small that the distance does not exceed a specifiable value.

Of special significance is the realization of the method according to the present invention in the form of a control element that is provided for a control device for controlling/regulating specific motor-vehicle components or for an operating- or accident-data recorder of a motor vehicle. Stored on the control element in this context is a program that can be executed on a computing device, in particular, on a microprocessor, and that is well suited for carrying out the method according to the present invention. In this case, the present invention is therefore realized by a program that is stored on the control element, so that this control element, which is furnished with the program, represents the present invention in the same way as does the method that the program is designed to carry out. The control element can be, in particular, an electrical storage medium, for example, a read-only memory, a random-access memory, or a flash memory.

Proceeding on the basis of the device for recording the scanned-information curve of the type cited above, as a further solution of the objective of the present invention, it is proposed that the means for data reduction view the scanned-information curve in a time raster of a multiple of the scanning period, and determine, within the specific raster increments, at least one characteristic variable of the scanned-information curve.

According to one advantageous refinement of the present invention, it is proposed that the device have a means for carrying out the method according to the present invention.

According to a preferred embodiment of the present invention, it is proposed that the device be a component part of at least one control device for controlling/regulating specific motor vehicle components.

Alternatively, it is proposed that the device be a component part of an operating- or accident-data recorder of a motor vehicle.

In general, with regard to the examples of the motor-vehicle control device, the operating data recorder, as well as the accident-data recorder, the method according to the present invention can be carried out on a, or by a, computer or control unit. Therefore, the device according to the present invention can generally be viewed as a component part of a computer, or of a control unit.

In this context, steps of the method according to the present invention, or the method according to the present invention itself, is also carried out, if an appropriate computer program or an appropriate computer program product on a data carrier, in each case having program code means, is executed on a computer or a control unit. In this context, specifically in addition to a fixedly installed control element cited above, the data carrier can also be a mobile data carrier such as a CD-ROM, DVD, diskette, or any other optical, magnetic, electromagnetic, etc., storage medium, if the data carrier is, or is made, readable by a computer using appropriate auxiliary means.

DETAILED DESCRIPTION

Figure 1:
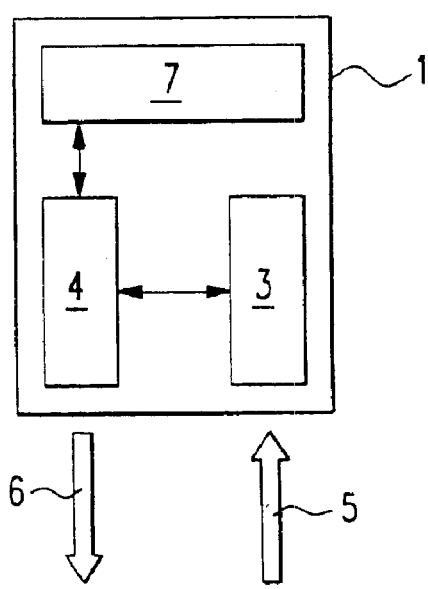
FIG. 1 depicts a device according to the present invention in accordance with a first preferred embodiment of the present invention.

The method according to the present invention functions to record the curve of information. The information to be recorded is specifically the operating data of a motor vehicle. The operating data are supplied by appropriate sensors and are made available in digital form, i.e., the continuous temporal curve of the operating data signal is scanned using a specifiable scanning period. The operating data to be recorded are, for example, the speed of the motor vehicle, the temperature and the operating point of the internal combustion engine of the motor vehicle, the actuation of the gas pedal or brakes, or the actuation of specific motor vehicle functions, specifically the illumination or the directional lights.

The method according to the present invention is carried out in a control device 1 for controlling/regulating specific motor-vehicle components (see FIG. 1) or in an operating- or accident-data recorder 2 (see FIG. 2) of a motor vehicle. In control device 1, a control element 3 is provided, on which a program is stored that can be executed on a microprocessor 4. As control element 3, it is possible to use, in particular, an electrical storage medium, for example, a read-only memory, a random-access memory, or a flash memory. The program functions for the control/regulation of the motor-vehicle components. For this purpose, control device 1 is acted upon by input signals 5, which, using sensors, represent measured operating variables of an internal combustion engine or of other components of the motor vehicle. Control device I generates output signals 6, which, via actuators, or controllers, can influence the behavior of specific motor-vehicle components.

On control clement 3 of control device 1 from FIG. 1, a further program is stored, which can be executed on microprocessor 4 and which is well suited for carrying out the method according to the present :invention. The operating data to be recorded are stored in a further storage element 7 of control device 1.

Figure 2:
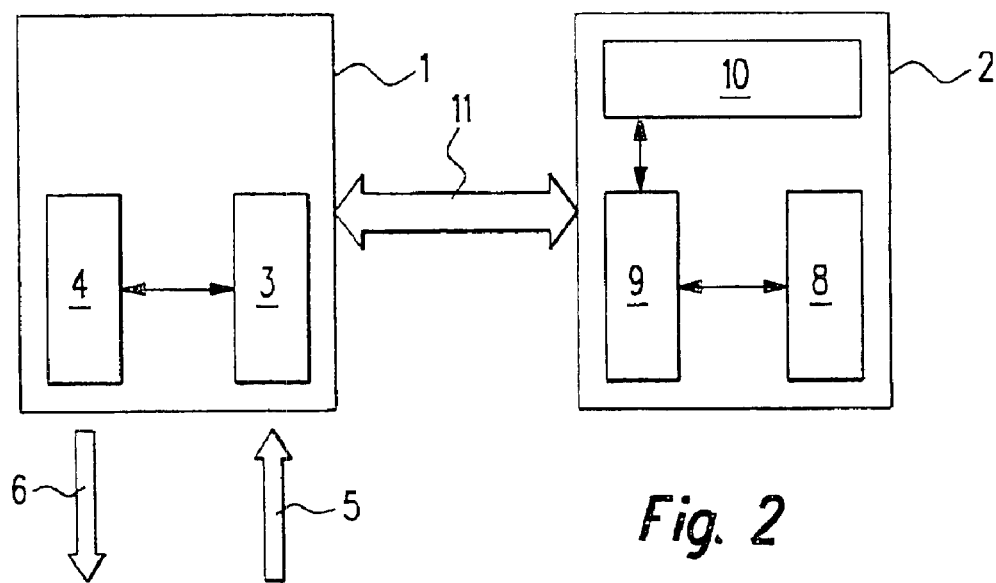
FIG. 2 depicts a device according to the present invention in accordance with a second preferred embodiment of the present invention.

In the exemplary embodiment from FIG. 2, operating- or accident-data recorder 2 has a control element 8 and a microprocessor 9. Stored on control element 8 is a further program that can be executed on microprocessor 9 and that is suited for carrying out the method according to the present invention. As element 8, it is possible to use, in particular, an electric storage medium, for example, a read-only memory (ROM), including EPROM or EEPROM, a random-access memory (RAM), including FeRAM, or a flash memory. The operating data to be recorded are stored in a further storage element 10 of operating- or accident-data recorder 2. Information to be recorded is transmitted from control device 1 to operating- or accident-data recorder 2 via a suitable data interface 11.

Because the storage space is limited in a control device, or in an operating- or accident-data recorder, it is necessary to reduce the data volume to be stored. Therefore, the scanned operating data are first subjected to a data reduction. Thereupon, the reduced operating data either, for a further reduction of the data volume, can be subjected to a data compression and only then stored in further storage element 7 or 10, or they can be stored immediately.

Figure 3:
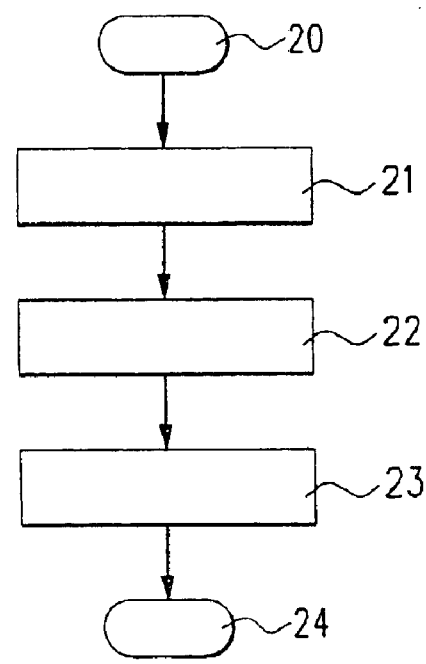
FIG. 3 depicts a flow diagram of the method according to the present invention in accordance with one preferred embodiment.

FIG. 3 depicts a flow diagram of a method according to the present invention for recording the operating data of a motor vehicle. The temporal curve of the operating data to be recorded is designated in FIG. 4 as reference numeral 12. The method begins in function block 20. Then in a function block 21, in the context of the data reduction, raster increments 13 are determined of a time raster in which curve 12 of the operating data to be recorded is viewed. Raster increments 13 are a multiple of the scanning period, in the present case, 400 ×$10^{-6}$ seconds.

In a function block 22, within individual raster increments 13, a plurality of characteristic variables of curve 12 of the scanned operating data are determined. In a function block 23, the measured characteristic variables are then stored in further storage element 7, 10. According to the present invention, not some or all scanning values of curve 12 of the operating data to be recorded are stored, but rather only the characteristic variables within raster increments 13.

Figure 4:
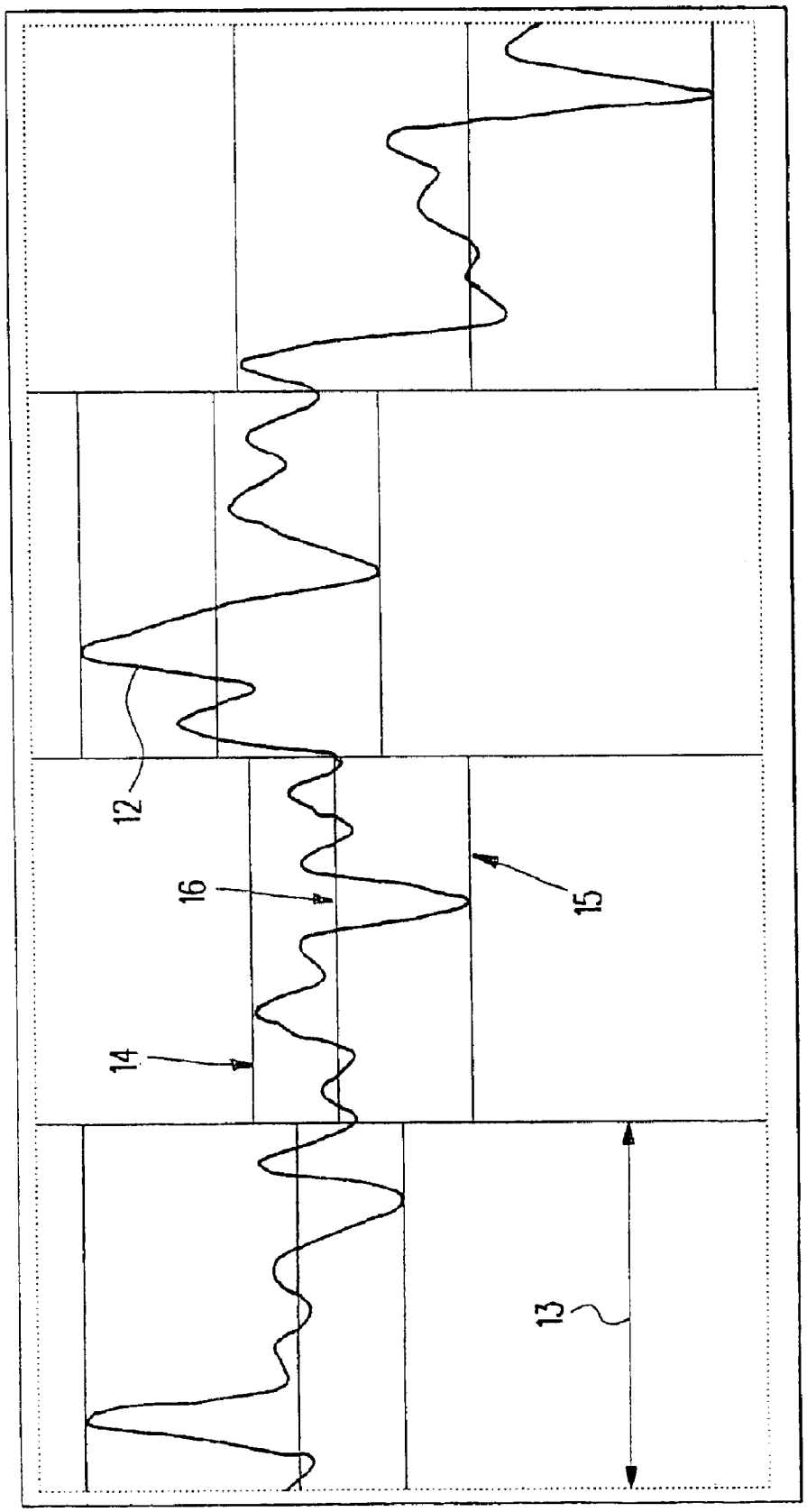
FIG. 4 depicts a curve of information to be recorded.

The data reduction underlying the method according to the present invention is discussed in greater detail on the basis of FIG. 4. In the present exemplary embodiment, as characteristic variables, maximum value 14, minimum value 15, and average value 16 of the scanning values of curve 12 are determined within one raster increment 13. Nevertheless, it is also possible to measure any other characteristic-variable. Raster increments 13 can either be selected so as to be identical in size or so as to vary as a function of further characteristic variables of curve 12 of the scanned operating data. As further characteristic variables, one can mention, for example, statistical variables of the scanned values of curve 12, in particular, the standard deviation, within one raster increment 13. In this context, raster increments 13 can be selected so as to be so small that the standard deviation does not exceed a specifiable value.

Alternatively, raster increments 13 are selected so as to vary as a function of the distance from maximum value 14 or from minimum value 15 to average value 16 of the scanned values of curve 12 within one raster increment 13. In this context, raster increments 13 are selected so as to be so small that the distance does not exceed a specifiable value.

What is claimed is:

1. A method for recording a curve of information scanned using a specifiable scanning period, comprising:
   subjecting the scanned information to a data reduction to produce reduced data;
   storing the reduced data;
   viewing the curve, in a context of the data reduction, in a time raster of a multiple of the scanning period;
   within individual raster increments, determining at least one characteristic variable of the curve; and
   selecting the raster increments so as to vary as a function of at least one further characteristic variable of the curve within one raster increment.

2. The method as recited in claim 1, wherein:
   the scanned information includes operating data of a motor vehicle.

3. The method as recited in claim 1, further comprising:
   determining at least one of maximum values and minimum values of values of the scanned information within the raster increments, as the at least one characteristic variable of the curve.

4. The method as recited in claim 1, further comprising:
   determining an average value of values of the scanned information within the raster increments, as the at least one characteristic variable of the curve.

5. The method as recited in claim 1, further comprising:
   selecting the raster increments so as to vary as a function of a standard deviation of values of the scanned information of the curve of the scanned information within one raster increment.

6. The method as recited in claim 4, further comprising:
   selecting the raster increments so as to be so small that the standard deviation does not exceed a specifiable value.

7. The method as recited in claim 1, further comprising:
   selecting the raster increments so as to vary as a function of a distance of one of a maximum value and a minimum value from an average value of values of the scanned information within one raster increment of the curve.

8. The method as recited in claim 6, further comprising:
selecting the raster increments so as to be so small that a distance does not exceed a specifiable value.

9. A control element, comprising:
a memory for storing a program that when executed on a computing device results in a performance of:
  subjecting scanned information to a data reduction to produce reduced data, storing the reduced data,
  viewing a curve of information scanned using a specifiable scanning period, in a context of the data reduction, in a time raster of a multiple of the scanning period,
  within individual raster increments, determining at least one characteristic variable of the curve, and
  selecting the raster increments so as to vary as a function of at least one further characteristic variable of the curve within one raster increment.

10. The control element as recited in claim 8, wherein:
the memory includes one of a read-only memory (ROM) including one of an EPROM and an EEPROM, a random-access memory (RAM) including a FeRAM, and a flash memory, for one of a control device for controlling/regulating motor-vehicle components, an operating recorder, and an accident data recorder of a motor vehicle.

11. The control element as recited in claim 8, wherein:
the computing device includes a microprocessor.

12. A device for recording a curve of information scanned using a specifiable scanning period, comprising:
  an arrangement for subjecting the scanned information to a data reduction to produce reduced data;
  an arrangement for storing the reduced data, the arrangement for storing being capable of viewing the curve, in a context of the data reduction, in a time raster of a multiple of the scanning period;
  an arrangement for, within individual raster increments, determining at least one characteristic variable of the curve; and
  an arrangement for selecting the raster increments so as to vary as a function of at least one further characteristic variable of the curve within one raster increment.

13. The device as recited in claim 11, wherein:
the scanned information includes operating data of a motor vehicle.

14. The device as recited in claim 11, further comprising:
an arrangement for determining at least one of maximum values and minimum values of values of the scanned information within the raster increments, as the at least one characteristic variable of the curve.

15. The device as recited in claim 11, further comprising:
an arrangement for determining an average value of values of the scanned information within the raster increments, as the at least one characteristic variable of the curve.

16. The device as recited in claim 11, further comprising:
an arrangement for selecting the raster increments so as to vary as a function of a standard deviation of values of the scanned information of the curve of the scanned information within one raster increment.

17. The device as recited in claim 15, further comprising:
an arrangement for selecting the raster increments so as to be so small that the standard deviation does not exceed a specifiable value.

18. The device as recited in claim 11, further comprising:
an arrangement for selecting the raster increments so as to vary as a function of a distance of one of a maximum value and a minimum value from an average value of values of the scanned information within one raster increment of the curve.

19. The device as recited in claim 17, further comprising:
an arrangement for selecting the raster increments so as to be so small that a distance does not exceed a specifiable value.

20. The device as recited in claim 11, wherein:
the device is a component part of at least one control device for controlling/regulating motor-vehicle components.

21. The device as recited in claim 11, wherein:
the device is a component part of one of an operating recorder and an accident data recorder of a motor vehicle.

22. A computer program including a program code arrangement, the computer program, when executed on a computer, resulting in a performance of:
  subjecting scanned information to a data reduction to produce reduced data, storing the reduced data,
  viewing a curve of information scanned using a specifiable scanning period, in a context of the data reduction, in a time raster of a multiple of the scanning period,
  within individual raster increments, determining at least one characteristic variable of the curve, and
  selecting the raster increments so as to vary as a function of at least one further characteristic variable of the curve within one raster increment.

23. A computer program product including a program code arrangement stored on a data carrier, the computer program, when executed on a computer, resulting in a performance of:
  subjecting scanned information to a data reduction to produce reduced data, storing the reduced data,
  viewing a curve of information scanned using a specifiable scanning period, in a context of the data reduction, in a time raster of a multiple of the scanning period,
  within individual raster increments, determining at least one characteristic variable of the curve, and
  selecting the raster increments so as to vary as a function of at least one further characteristic variable of the curve within one raster increment.

* * * * *